US012548940B2

(12) United States Patent
Zhu et al.

(10) Patent No.: US 12,548,940 B2
(45) Date of Patent: Feb. 10, 2026

(54) WATERPROOF ELECTRICAL CONNECTOR WITH IMPROVED SEALING CUSHION

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Jian-Kuang Zhu, Kunshan (CN); Kuo-Chun Hsu, New Taipei (TW); Yin-Chao Xu, Kunshan (CN); Jia-Qing Liu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 301 days.

(21) Appl. No.: 18/381,853

(22) Filed: Oct. 19, 2023

(65) Prior Publication Data

US 2024/0136760 A1 Apr. 25, 2024
US 2024/0235103 A9 Jul. 11, 2024

(30) Foreign Application Priority Data

Oct. 20, 2022 (CN) ......................... 202222765416.5

(51) Int. Cl.
*H01R 13/52* (2006.01)

(52) U.S. Cl.
CPC ..... *H01R 13/5213* (2013.01); *H01R 13/5227* (2013.01)

(58) Field of Classification Search
None
See application file for complete search history.

(56) References Cited

U.S. PATENT DOCUMENTS 6,558,180 B2 5/2003 Zhu et al.

FOREIGN PATENT DOCUMENTS

| | | | | |
|---|---|---|---|---|
| CN | 211456029 U | | 9/2020 | |
| CN | 213184760 U | | 5/2021 | |
| CN | 114465046 A | * | 5/2022 | ......... H01R 13/5213 |
| CN | 217114960 U | | 8/2022 | |
| CN | 217239860 U | | 8/2022 | |
| CN | 219801342 U | | 10/2023 | |
| TW | M484218 U | | 8/2014 | |
| WO | WO-2018092276 A1 | * | 5/2018 | ........... G06F 1/1656 |

* cited by examiner

*Primary Examiner* — Tho D Ta
(74) *Attorney, Agent, or Firm* — Ming Chieh Chang

(57) ABSTRACT

A waterproof electrical connector includes a connector body and a waterproof cap. The connector body includes a mating island surrounded by a ring groove. The mating island defines a mating face and plural passageways. The passageways receive conductive terminals and penetrate through the mating face. A soft cushion is set inside the waterproof cap. The connector body includes a collar portion. The collar portion is higher than the mating face and forms an entrance cavity around the ring groove. When the cap covers the connector body, the soft cushion penetrates into the entrance cavity to press and seal the mating face.

17 Claims, 11 Drawing Sheets

WATERPROOF ELECTRICAL CONNECTOR WITH IMPROVED SEALING CUSHION

BACKGROUND OF THE INVENTION

Field of the Invention

The present invention relates to a waterproof electrical connector with a sealed cap.

Description of Related Arts

U.S. Pat. No. 6,558,180 discloses an electrical connector comprising: an electrical contact housing having a first end and a second end with at least one bore extending between said first and second ends; at least one electrical contact being retained within said bore of said electrical contact housing; an outer casing including an attachment portion fixedly coupled to said first end of said electrical contact housing and a tubular portion radially spaced from said second end of said electrical contact housing to form an annular space between an inner surface of said tubular portion and said second end of said electrical contact housing, said tubular portion of said outer casing having an inwardly extending protrusion with an abutment surface that faces away from said second end of said electrical contact housing, said outer casing including at least a substantially rigid sleeve; and an annular sealing member formed of a resilient and compressible material that is located in said annular space and fixedly coupled to said tubular portion of said outer casing. However, the waterproof effect of the connector needs further improvement.

Taiwan Utility Model TWM484218U discloses a waterproof electrical connector comprising: a connector body having a mating face, one or more connectors received in the connector body, a waterproof cap pivotally retained to the connector body, and a soft cushion disposed on the waterproof cap, wherein the connector body the soft cushion presses against and seals the mating face when the waterproof cap is pivoted to cover the connector body.

SUMMARY OF THE INVENTION

An object of the present invention is to provide a waterproof electrical connector with improved waterproof means.

To achieve the above-mentioned object, a waterproof electrical connector comprises: a connector body defining a mating island and a ring groove surrounding the mating island, the mating island defining a mating face and a plurality of passageways running through the mating face; a plurality of conductive terminals respectively received in the plurality of passageways; a waterproof cap pivotally retained to the connector body; and a soft cushion disposed at an inside of the waterproof cap, wherein the connector body has a collar portion higher than the mating face and surrounding the ring groove to define an entrance cavity, and the soft cushion passes through the entrance cavity and presses against and seals the mating face of the mating island when the waterproof cap covers on the connector body.

Other advantages and novel features of the invention will become more apparent from the following detailed description of the present embodiment when taken in conjunction with the accompanying drawings.

DETAILED DESCRIPTION OF THE DRAWINGS

Figure 4:
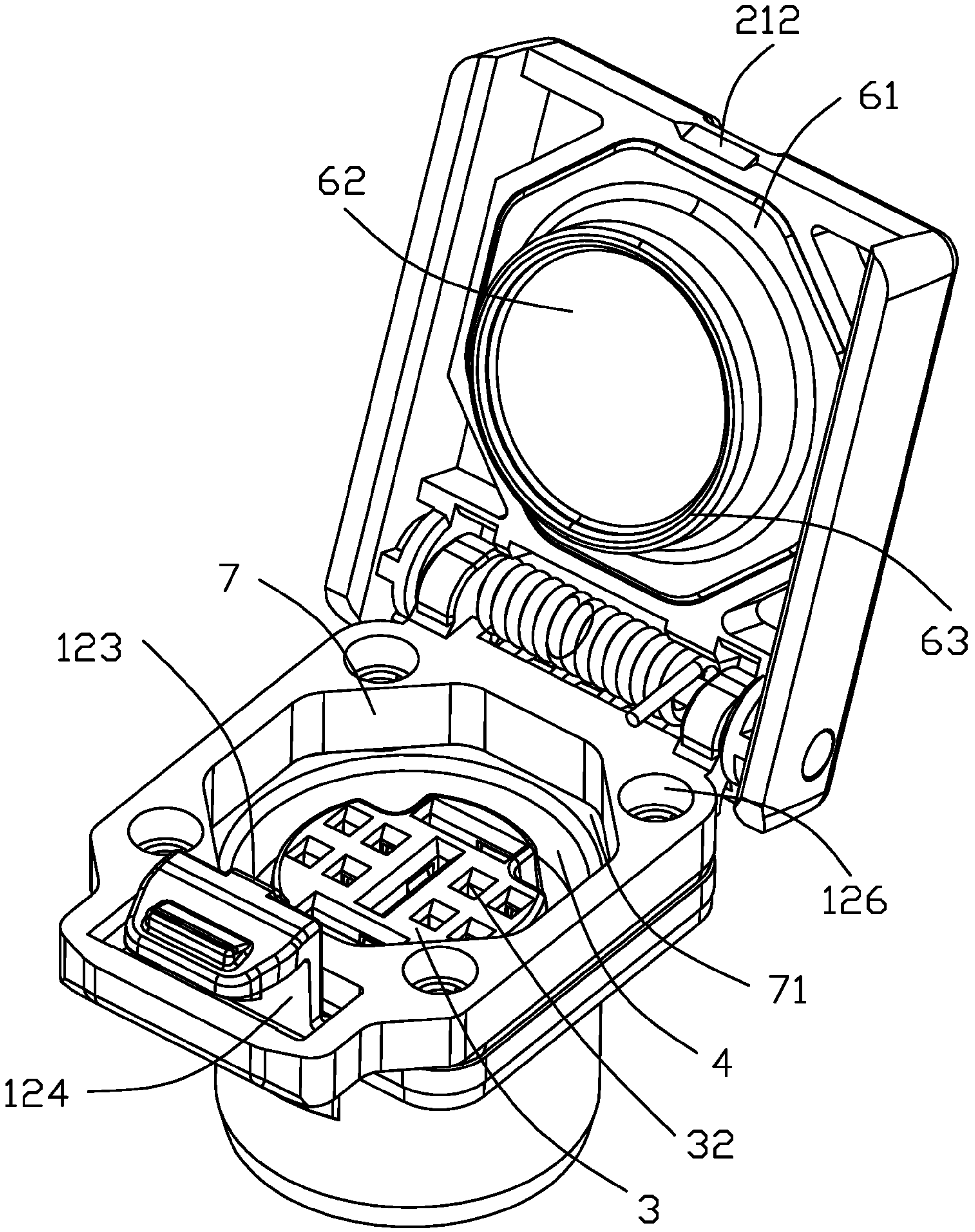
FIG. 4 is a perspective view of the waterproof electrical connector when the waterproof cap is open in FIG. 1.
Figure 5:
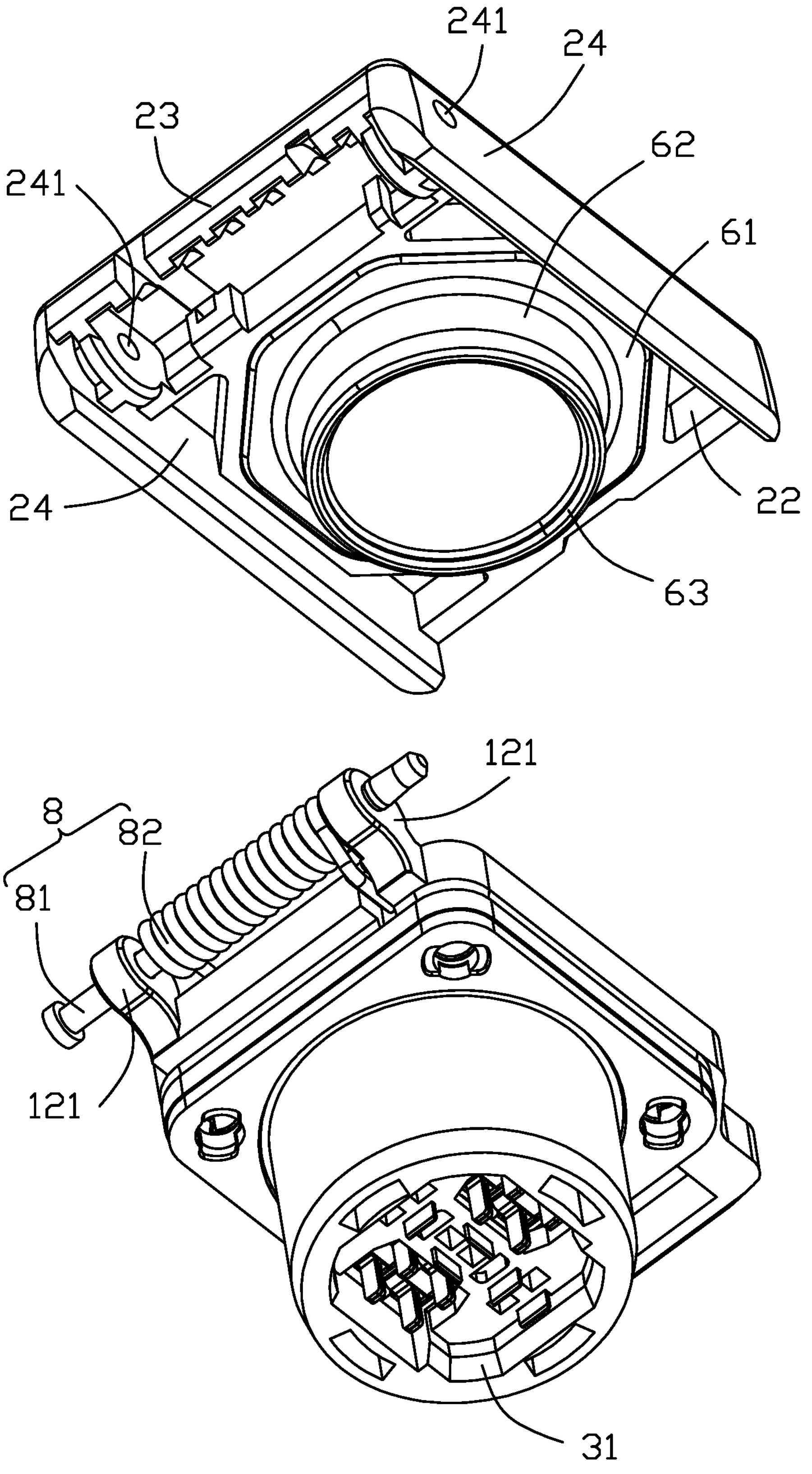
FIG. 5 is an exploded perspective view of the waterproof electrical connector in FIG. 3.

Referring to FIGS. 1-4, a waterproof electrical connector 100 comprises a connector body 1 and a waterproof cap 2 pivotally retained to the connector body 1. The cap 2 rotates towards the connector body 1 and seals the top end of connector body 1 to get a waterproof performance. Referring to FIGS. 4-5, the connector body 1 defines a mating island 3 and a ring groove 4 surrounding the mating island. The mating island 3 defines a mating face 31 and a plurality of passageways 32 running through the mating face 31. The passageways 32 are retained with a plurality of metallic conductive terminals 5 respectively. The cap 2 defines a soft cushion 6 at an inside thereof. After the cap 2 rotates to the connector body 1 in a closed statue, the soft cushion 6 presses against and seals the mating face 31. As a result, water vapor is blocked from the passageways 32, not influencing the terminals 5.

Figure 10:
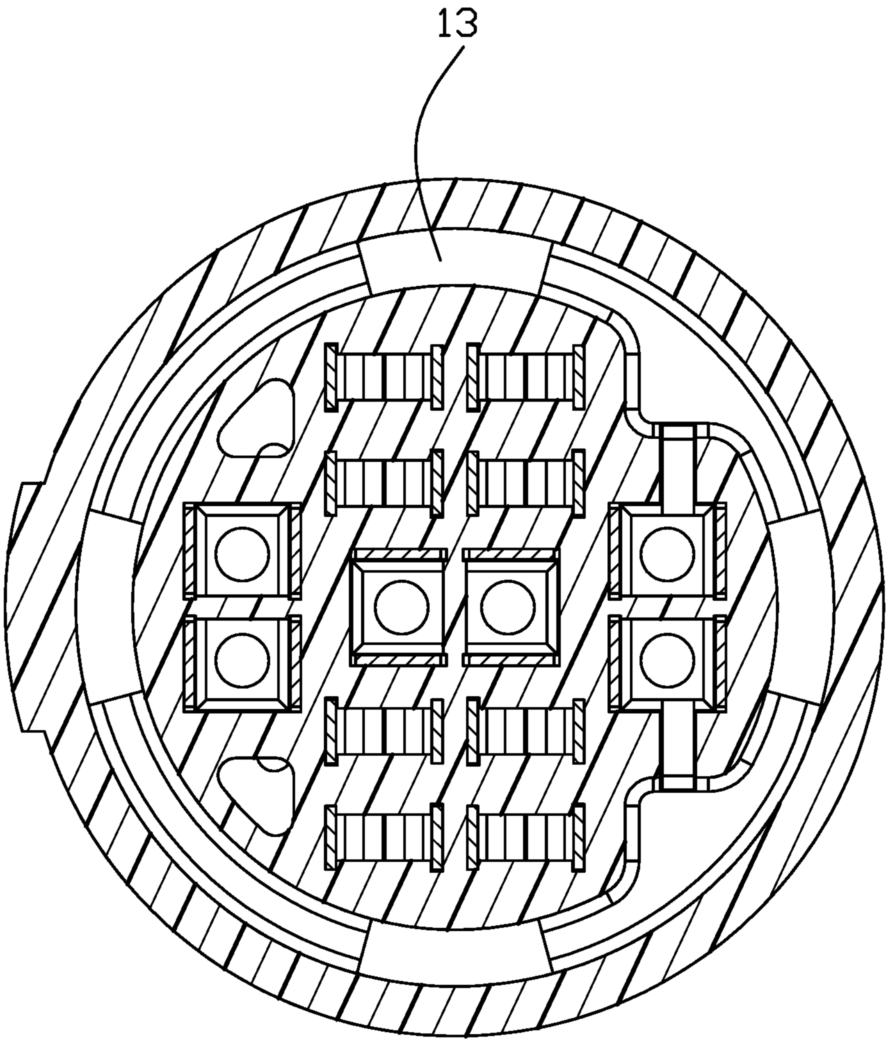
FIG. 10 is a cross-sectional view of the waterproof electrical connector taken along line 10-10 in FIG. 1.
Figure 11:
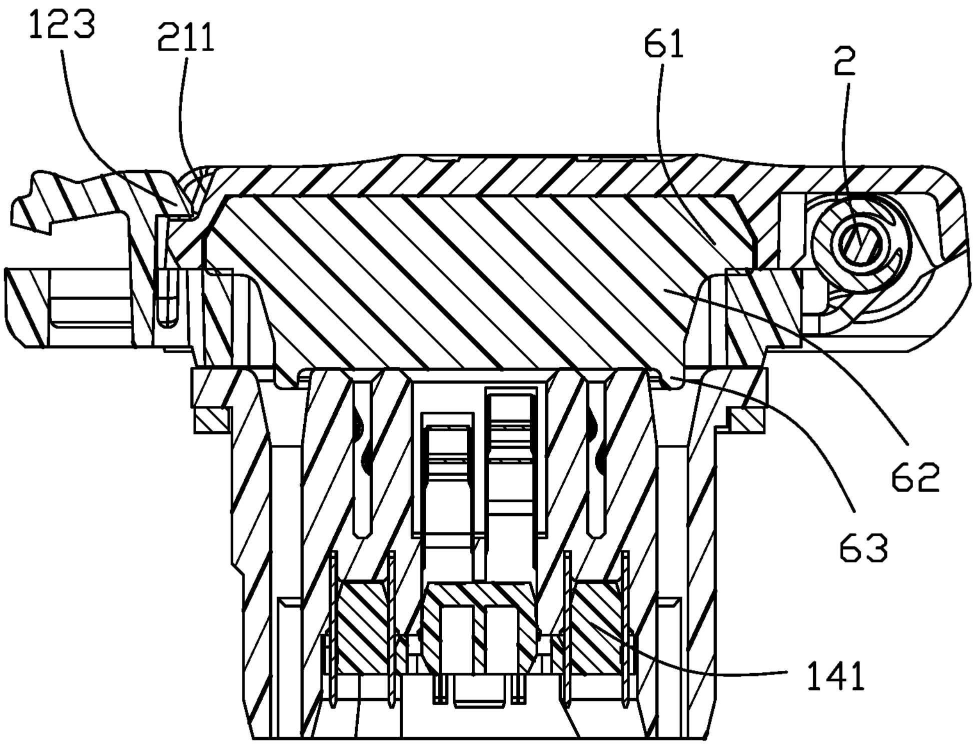
FIG. 11 is a cross-sectional view of the waterproof electrical connector taken along line 11-11 in FIG. 1.

Referring to FIGS. 1-4, the waterproof cap 2 is pivotally connected to the connector body 1 at one end thereof, and is buckled and fixed to the connector body 1 at another end thereof. The connector body 1 includes a collar portion 7 at the top end thereof, the collar portion 7 is located higher than the mating face 31 and surrounds the ring groove 4 to define an entrance cavity 71. As shown in FIG. 11, when the waterproof cap 2 covers the connector body 1, the soft cushion 6 goes through the entrance cavity 71 and presses against and seals the mating face 31. Meanwhile, the sides of soft cushion 6 press against the insides of the collar portion 7, so as to block the water vapor from going into the ring groove 4. The waterproof to the passageways 32 is improved. In addition, a skirt portion 63 of the soft cushion 6 extends downwards from the bottom of the soft cushion 6 and protrudes into the ring groove 4 to prevent water vapor from entering into the passageways 32 through the gap between the soft cushion 6 and the mating face 31. As shown in FIG. 10, the connector body 1 further defines four drainage holes 13 communicating upwards with the ring groove 4 and going downwards through a bottom face thereof in a vertical direction perpendicular to the mating face 31.

Figure 6:
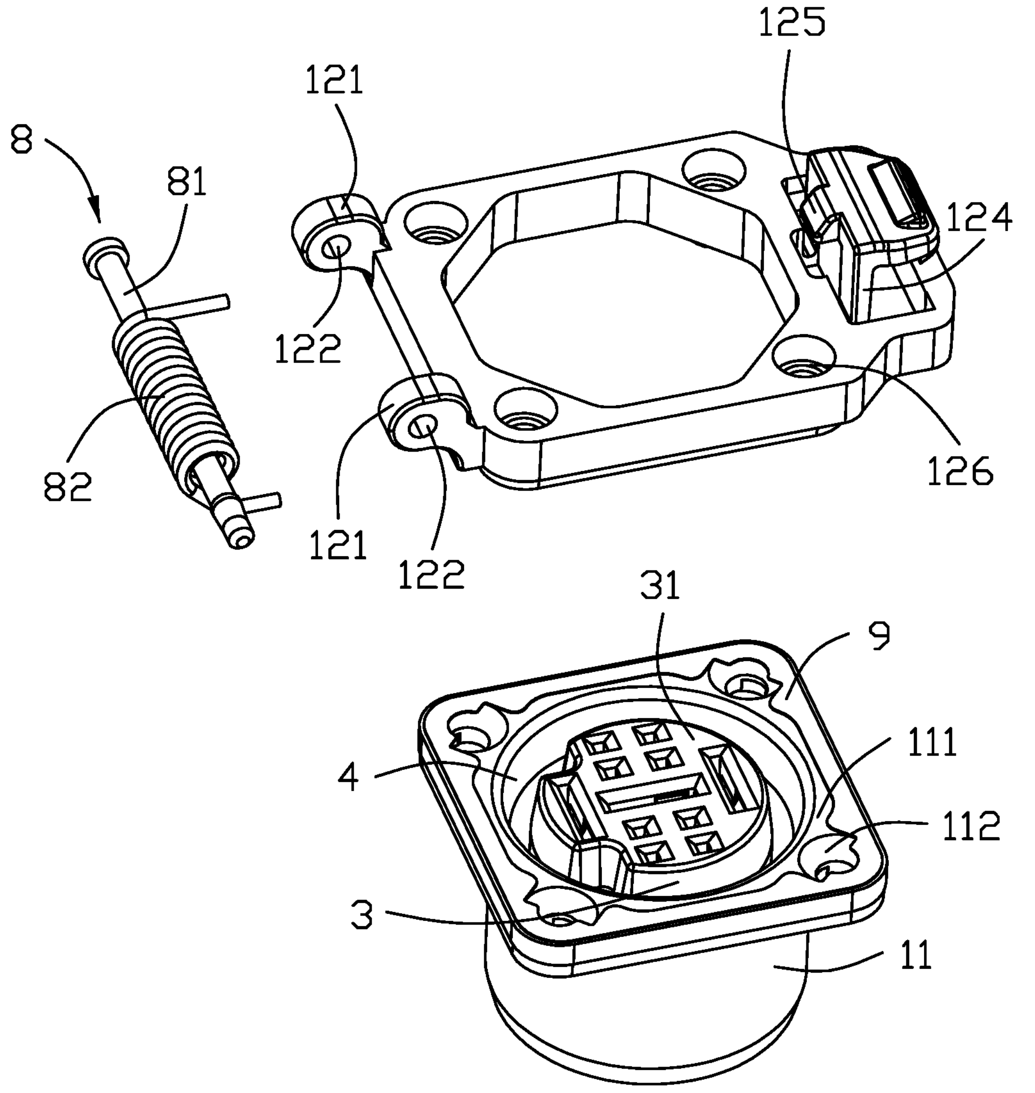
FIG. 6 is a further exploded perspective view of a connector body in FIG. 5.

Referring to FIGS. 5-6, the cap 2 is assembled on the connector body 1 via a pivot structure 8. The connector body 1 includes an insulative housing 11 and a mounting frame 12. The mating island 3 and the ring groove 4 are defined in the insulative housing 11. The mounting frame 12 is fixed on the mating face 31 of the insulative housing 11 and defines the collar portion 7. The cap 2 includes a top portion 21 and a front portion 22, a back portion 23 and two side portions 24 extending downwards from the top portion 21. The top portion 21 confronts with the mating face 31 when the cap is in the closed statue.

Figure 1:
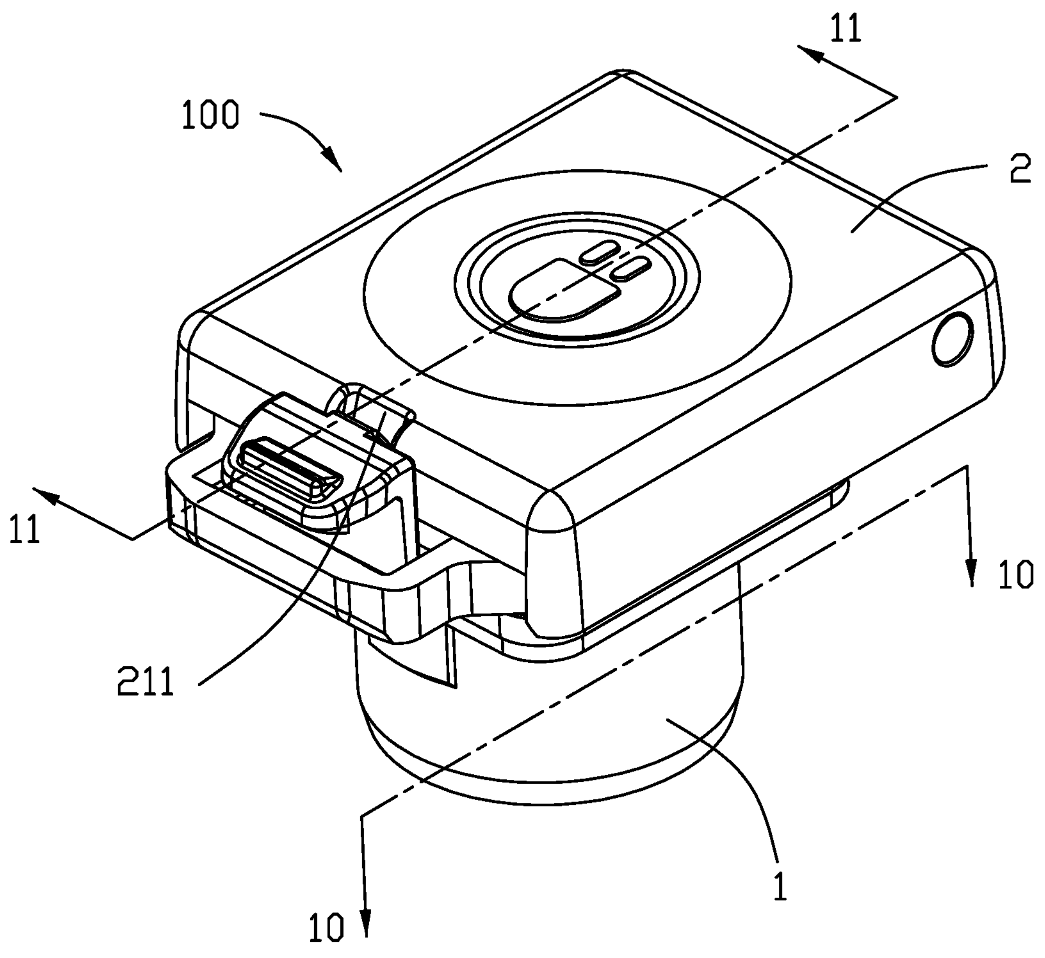
FIG. 1 is a top perspective view of a waterproof electrical connector of an embodiment of this present invention.
Figure 2:
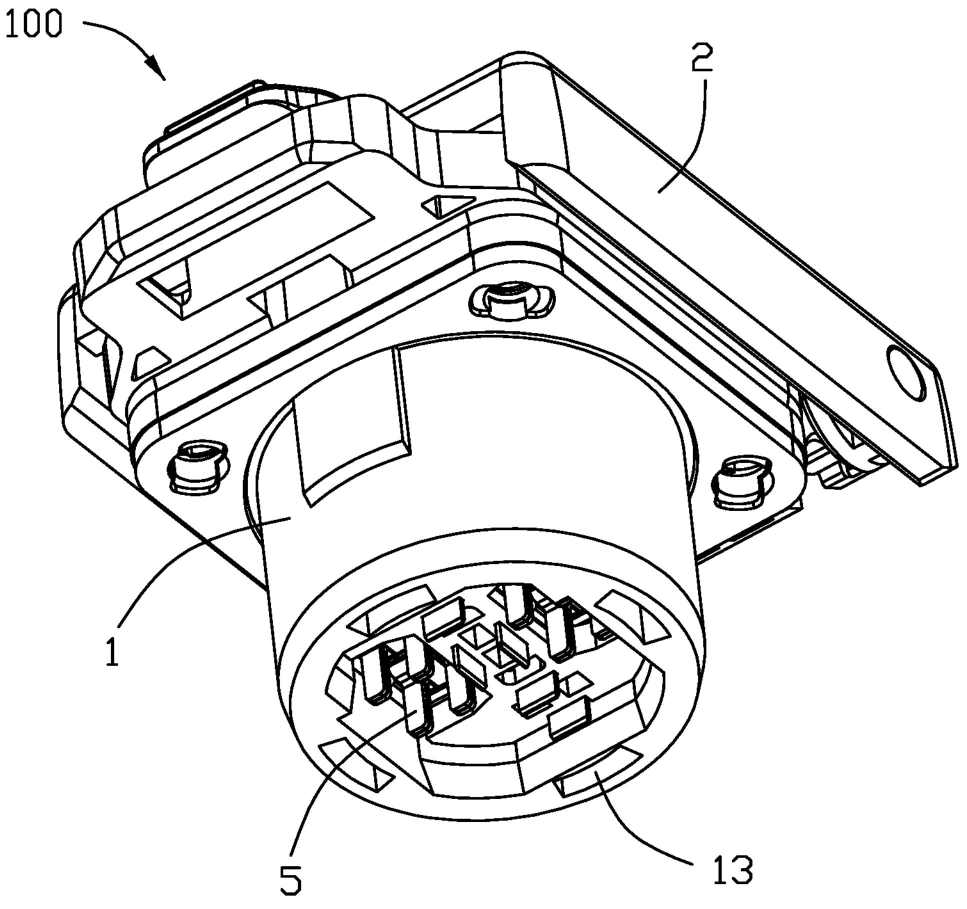
FIG. 2 is a bottom perspective view of the waterproof electrical connector in FIG. 1.
Figure 3:
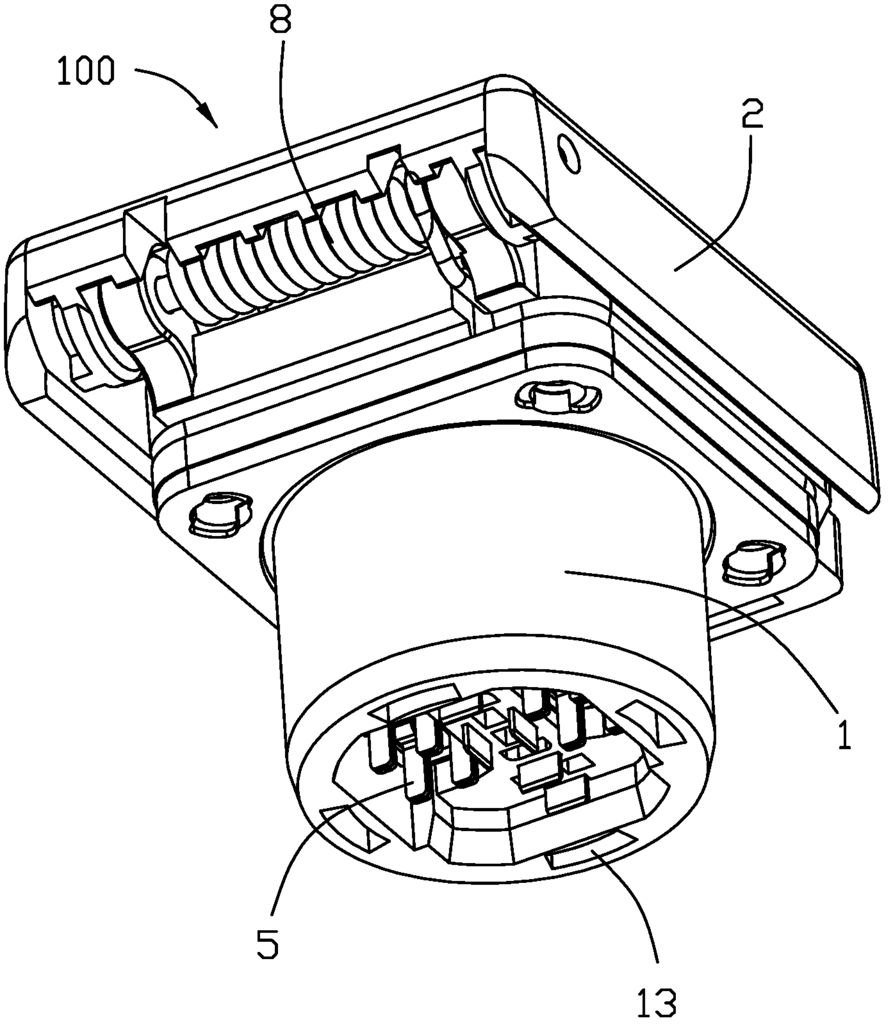
FIG. 3 is another bottom perspective view of the waterproof electrical connector in FIG. 2.

Further, as shown in FIG. 5, a pair of extension portions 121 extends backwards from the mounting frame 12 and defines a pair of holes 122. The side portion 24 defines a pair of holes 241 aligned with the holes 122 when the cap is assembled to the mounting frame 12. The pivot structure 8 includes a rotating shaft 81 and a torsion spring 82. The rotating shaft 81 is inserted into the aligned holes 241 and holes 122, so that the cap 2 is assembled on one end of the mounting frame 12, the torsion spring 82 is assembled on the rotating shaft 81 to push the cap 2 towards the mating face 31 thereby realizing the pivoting connection between the connector body 1 and the cap 2. The mounting frame 12 defines an elastic portion 124 extending upwards therefrom, with a locking convex 123 protruding rearwards towards the mating face 31. Referring to FIG. 1 and FIG. 11, the top portion 21 of the cap 2 defines a locking recess 211 to match with the locking convex 123. The locking recess 211 is defined at a middle portion of a front edge of the top portion 2. A first slanting face 212 is defined below the locking recess. The buckle convex 123 defines a second slanting face 125 at a top thereof, which is used to match the first slanting face 212. When the cap 2 is in the closed statue, the locking recess 211 is locked with the buckle convex 123, so that the waterproof cap 2 is locked with the mounting frame 12, so as to realize a locking statue of the waterproof cap 2 and the connector body 1. As shown in FIG. 5, the soft cushion 6 includes a base portion 61 and a pressing portion 62 protruding from the base portion 61. As shown in FIG. 11, the side edges of the base portion 61 press against the top of the mounting frame 12 and the pressing portion 62 presses against the mating face 31 of the mating island 3. What's more, a skirt portion 63 extends downwards around the pressing portion 62 and protrudes into the ring groove 4, which not only assists in waterproofing but also serves as a positioning element when the cap 2 covers the connector body 1.

As shown in FIG. 6, one end of the torsion spring 82 is attached to the rear face of the mounting frame 12, and as shown in FIG. 4, the other end is attached to the upper face of the mounting frame 12.

Figure 7:
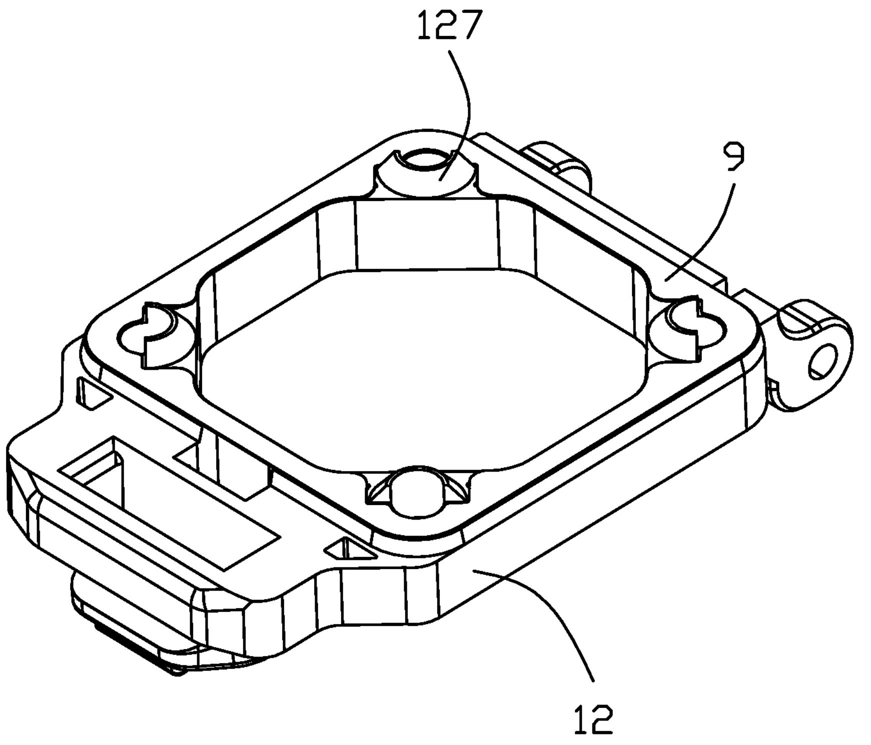
FIG. 7 is a perspective view of a mounting frame in FIG. 6.
Figure 8:
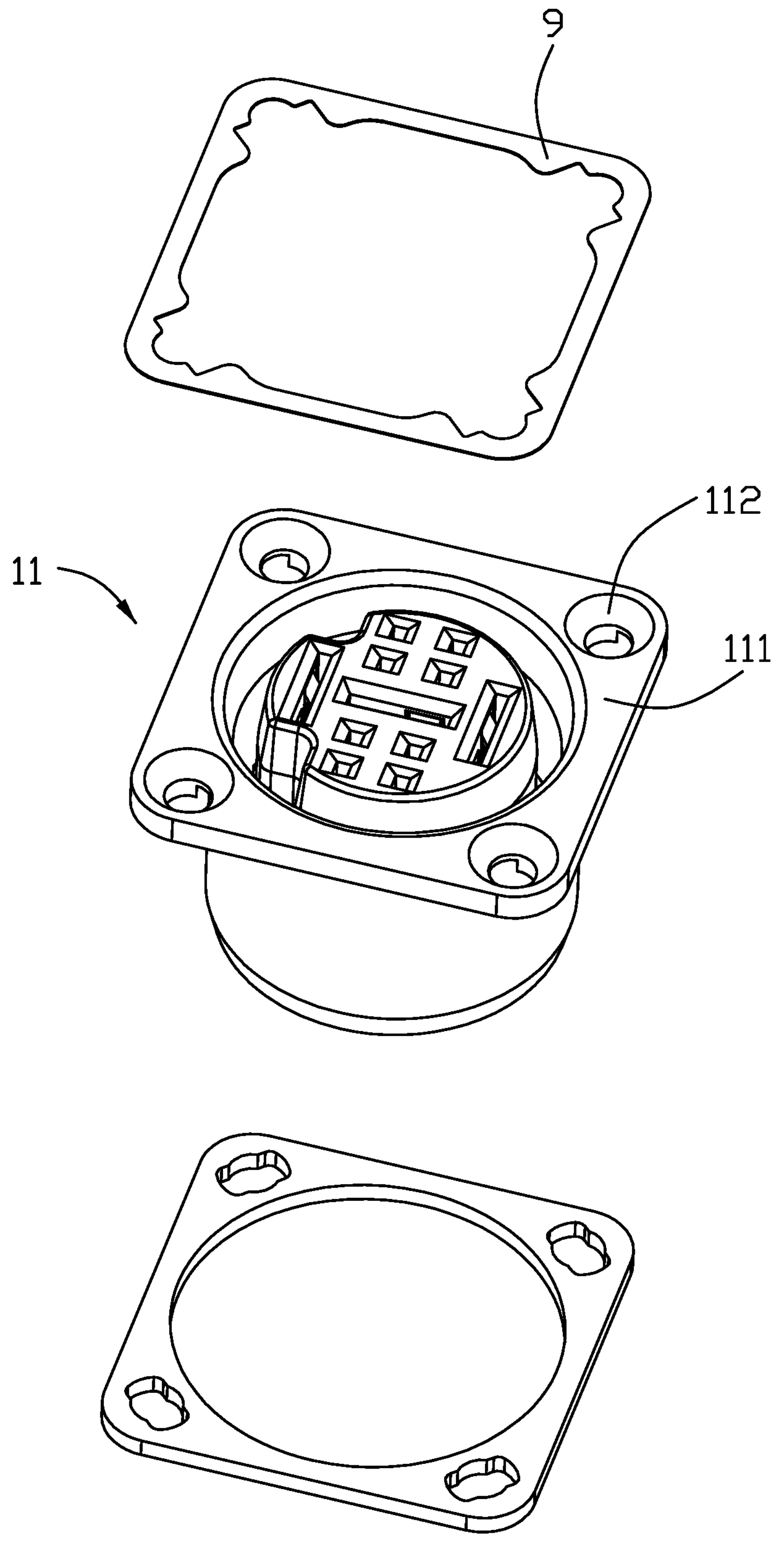
FIG. 8 is an exploded perspective view of the connector body in FIG. 6.

Referring to FIGS. 7-8, the insulative housing 11 defines a top flange 111 extending outwards and horizontally and four screw holes 113 at the top flange 111. The mounting frame 12 is attached on the top flange 111. The mounting frame 12 defines a screw hole 126 at each of four corners thereof and aligned with the screw holes 113, and a limiting bosses portion 127 proximate to corresponding screw hole 126 The limiting bosses portions 127 cooperate with the opening 112 defined on the top flange 111 for easy positioning of the mounting frame 12. A waterproof adhesive layer 9 is applied between the top portion 111 and the mounting frame 12. Therefore, the connection between the top portion 111 and the mounting frame 12 is secured, the water vaper that may be immersed from the screw hole 126 is blocked outside the waterproof adhesive layer 9 to achieve a good waterproof performance. It can see, the top flange 111 and the mounting frame 12 commonly forms a larger top flange. In alternative embodiment, the mounting frame 12 and the top flange 111 are integral, which two commonly form a large top flange. The top flange defines an upper mating face, the mating face 31 of the island is defined as a lower mating face which is located lower than the upper mating face.

Figure 9:
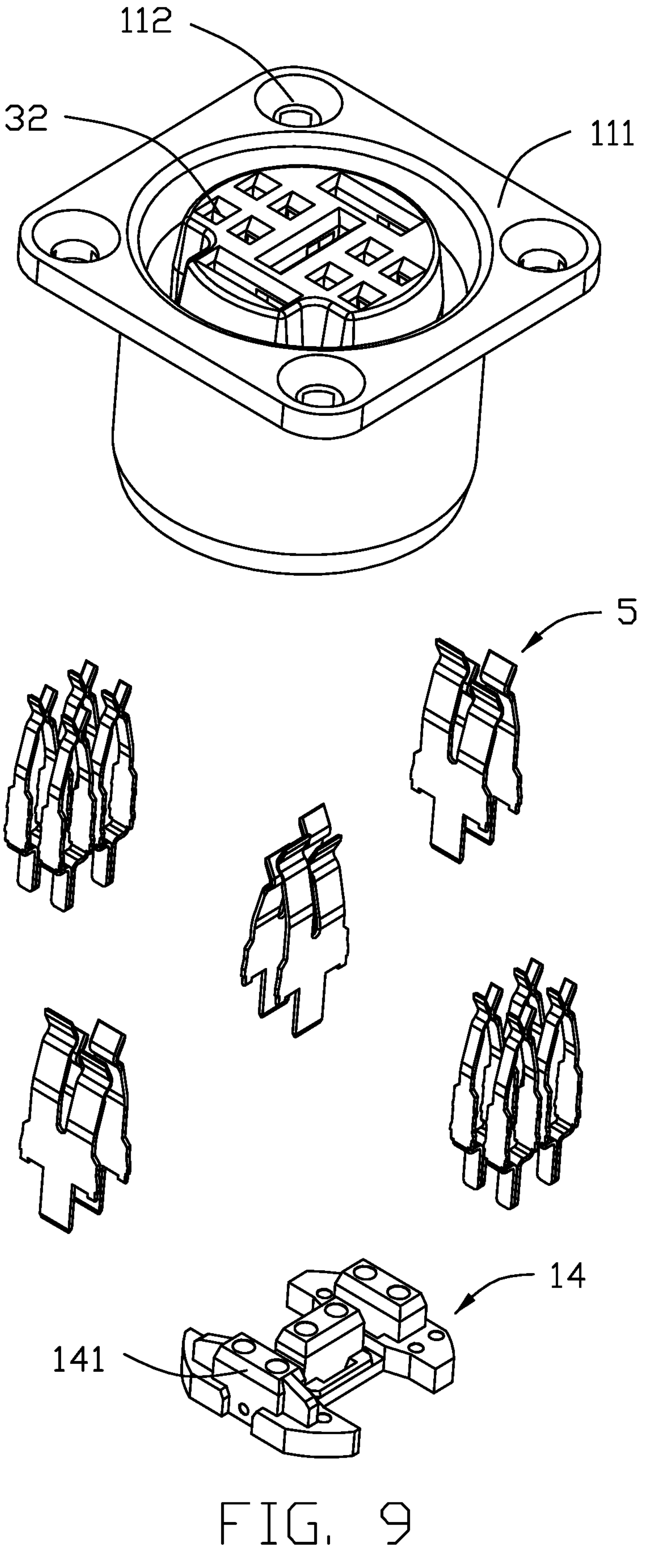
FIG. 9 is an exploded perspective view of the connector body in FIG. 8.

Referring to FIG. 9, the insulative housing 11 further includes a bottom cover 14. As shown in FIG. 5, the bottom of the mating island 3 defines a mounting cavity 31 recessed inwards and the bottom cover 14 is installed upwards to the mounting cavity 31. The bottom cover 14 defines a plurality of bumps 141 extending upwards into the passageways 32 and cooperating with the bottom cover 14 to shield passageways 32.

However, the disclosure is illustrative only, changes may be made in detail, especially in matter of shape, size, and arrangement of parts within the principles of the invention.

The invention claimed is:

1. A waterproof electrical connector comprising:

a connector body defining a mating island and a ring groove surrounding the mating island, the mating island defining a mating face and a plurality of passageways running through the mating face;

a plurality of conductive terminals respectively received in the plurality of passageways;

a waterproof cap pivotally retained to the connector body; and a soft cushion disposed at an inside of the waterproof cap;

wherein the connector body has a collar portion higher than the mating face and surrounding the ring groove to define an entrance cavity, and the soft cushion passes through the entrance cavity and presses against and seals the mating face of the mating island when the waterproof cap covers on the connector body.

2. The waterproof electrical connector as claimed in claim 1, wherein the soft cushion defines a skirt portion extending downwards, and the skirt portion protrudes into the ring groove when the waterproof cap covers on the connector body.

3. The waterproof electrical connector as claimed in claim 1, wherein the connector body defines a plurality of drainage holes communicating with the ring groove and opening downwards.

4. The waterproof electrical connector as claimed in claim 1, wherein said connector body comprises an insulative housing and a mounting fame fitly retained on the insulative housing, the insulating housing defines the mating island and the ring groove, and the mounting frame defines the collar portion.

5. The waterproof electrical connector as claimed in claim 4, wherein the cap is pivotably retained on the mounting frame via a pivot structure, and the cap is locked with the mounting frame when the cap covers on the connector body.

6. The waterproof electrical connector as claimed in claim 5, wherein the pivot structure comprises a rotating shaft and a torsion spring sleeved on the rotating shaft.

7. The waterproof electrical connector as claimed in claim 5, wherein the soft cushion comprises a base portion and a pressing portion extending from the base portion, the base portion presses against the mounting frame, and the pressing portion presses against the mating face of the mating island.

8. The waterproof electrical connector as claimed in claim 7, wherein the soft cushion comprises a skirt portion extending downwards from the pressing portion and protruding into the ring groove.

9. The waterproof electrical connector as claimed in claim 4, wherein the insulative housing defines a top flange attached to a bottom face of the mounting frame, and the top flange defines screw holes at four corners thereof.

10. The waterproof electrical connector as claimed in claim 9, wherein the mounting frame further defines limiting bosses proximate to the screw holes, and the limiting bosses protrude into corresponding limiting openings defined on the top flange.

11. The waterproof electrical connector as claimed in claim 9, wherein the top plate and the mounting frame is combined with waterproof adhesive.

12. The waterproof electrical connector as claimed in claim 4, wherein the mating island defines a mounting cavity recessed upwards, and the insulative housing defines a bottom cover assembled to the mounting cavity and shielding the passageways.

13. A waterproof electrical connector comprising:

a connector body comprising a mating island with a plurality of passageways and a top flange surrounding the mating island, the mating island defining a lower mating face and the top flange defining an upper mating face higher than the lower mating face;

a plurality of conductive terminals respectively received in the plurality of passageways;

a waterproof cap pivotally retained to the connector body; and a soft cushion disposed at an inside of the waterproof cap;

wherein the soft cushion comprises a base portion and a pressing portion extending downwards from the base portion, and a side edge of the base portion presses against the upper mating face and the pressing portion presses against the lower mating face when the waterproof cap covers on the connector body.

14. The waterproof electrical connector as claimed in claim 13, wherein the connector body defines a ring groove recessed from the lower mating face and surrounding the mating island, the soft cushion comprises a skirt portion extending downwardly from the pressing portion, and the skirt portion protrudes into the ring groove after the cap covers on the connector body.

15. The waterproof electrical connector as claimed in claim 13, wherein the connector body defines drainage holes communicating with the ring groove and an exterior.

16. The waterproof electrical connector as claimed in claim 13, wherein the connector body comprises an insulative housing and a mounting frame attached to the insulative housing, the mating island is defined on the insulative housing, and the top flange is defined on the mounting frame.

17. The waterproof electrical connector as claimed in claim 16, wherein the mounting frame is retained with the insulative housing via waterproof adhesive.

* * * * *